United States Patent
Oh et al.

(10) Patent No.: US 6,807,597 B2
(45) Date of Patent: Oct. 19, 2004

(54) INTEGRATED PC CARD HOST CONTROLLER FOR THE DETECTION AND OPERATION OF A PLURALITY OF EXPANSION CARDS

(75) Inventors: Hyang-Kyun Oh, Santa Clara, CA (US); Yishao Max Huang, San Jose, CA (US); Richard Brayden, Saratoga, CA (US)

(73) Assignee: 2Micro International Limited, Georgetown (KY)

( * ) Notice: Subject to any disclaimer, the term of this patent is extended or adjusted under 35 U.S.C. 154(b) by 108 days.

(21) Appl. No.: 10/173,245

(22) Filed: Jun. 17, 2002

(65) Prior Publication Data

US 2002/0152047 A1 Oct. 17, 2002

Related U.S. Application Data

(63) Continuation of application No. 09/536,578, filed on Mar. 28, 2000, now Pat. No. 6,470,284.
(60) Provisional application No. 60/147,544, filed on Aug. 5, 1999, provisional application No. 60/161,249, filed on Oct. 25, 1999, and provisional application No. 60/174,948, filed on Jan. 7, 2000.

(51) Int. Cl.[7] ............................................. G06F 19/00
(52) U.S. Cl. ...................................... 710/301; 710/313
(58) Field of Search ................................. 710/301, 300, 710/313; 735/486; 702/109

(56) References Cited

U.S. PATENT DOCUMENTS

| | | | | |
|---|---|---|---|---|
| 6,009,363 A | * | 12/1999 | Beckert et al. | 701/33 |
| 6,055,595 A | * | 4/2000 | Tachibana et al. | 710/102 |
| 6,092,133 A | * | 7/2000 | Erola et al. | 710/102 |
| 6,223,984 B1 | * | 5/2001 | Renner et al. | 235/380 |
| 6,256,692 B1 | * | 7/2001 | Yoda et al. | 710/104 |
| 6,286,060 B1 | * | 9/2001 | DiGiorgio et al. | 710/31 |
| 6,371,376 B1 | * | 4/2002 | Dan | 235/486 |
| 6,438,550 B1 | * | 8/2002 | Doyle et al. | 707/9 |
| 6,516,373 B1 | * | 2/2003 | Talbot et al. | 710/310 |

FOREIGN PATENT DOCUMENTS

| | | | |
|---|---|---|---|
| EP | 0 632 393 A | 1/1995 | G06F/13/40 |
| EP | 0 709 785 A | 5/1996 | G06F/13/40 |
| EP | 0 772 134 A | 5/1997 | G06F/13/40 |
| EP | 0 860 781 A | 8/1998 | G06F/13/40 |

* cited by examiner

*Primary Examiner*—Marc S. Hoff
*Assistant Examiner*—Paul Kim
(74) *Attorney, Agent, or Firm*—Grossman Tucker Perreault & Pfleger, PLLC

(57) ABSTRACT

An integrated controller for the detection and operation of both PC Cards, smart cards and passive smart card adapter cards. In one aspect, the invention detects the presence of standard expansion cards or passive smart card adapters by utilizing the reserved detection and voltage selection signal area defined by the PC Card specification. In another aspect, the invention provides an integrated controller that includes logic to operate either a standard expansion card or a passive smart card adapter by reassigning certain PC Card signal lines to operate a standard expansion card or a passive smart card adapter, thereby eliminating the need to provide pins in addition to those defined by the PC Card specification.

9 Claims, 7 Drawing Sheets

| CD2#/CCD2# (pin 67) | CD1#/CCD1# (pin 36) | VS2#/CVS2 (pin 57) | VS1#/CVS1 (pin 43) | Key | Interface | Voltage |
|---|---|---|---|---|---|---|
| ground | ground | open | open | 5V | 16-bit PC Card | 5 V |
| ground | ground | open | ground | 5V | 16-bit PC Card | 5 V and 3.3 V |
| ground | ground | ground | ground | 5V | 16-bit PC Card | 5 V, 3.3 and X.XV |
| ground | ground | open | ground | LV | 16-bit PC Card | 3.3 V |
| ground | connect to CVS1 | open | connect to CCD1# | LV | CardBus PC Card | 3.3 V |
| ground | ground | ground | ground | LV | 16-bit PC Card | 3.3 V and X.X V |
| connect to CVS2 | ground | connect to CCD2# | ground | LV | CardBus PC Card | 3.3 V and X.X V |
| connect to CVS1 | ground | ground | connect to CCD2# | LV | CardBus PC Card | 3.3 V,X.X V and Y.Y V |
| ground | ground | ground | open | LV | 16-bit PC Card | X.X V |
| connect to CVS2 | ground | connect to CCD2# | open | LV | CardBus PC Card | X.X V |
| ground | connect to CVS2 | connect to CCD1# | open | LV | CardBus PC Card | X.X V and Y.Y V |
| connect to CVS1 | ground | ground | connect to CCD2# | LV | CardBus PC Card | Y.Y V |
| ground | connect to CVS1 | ground | connect to CCD1# | | reserved | |
| ground | connect to CVS2 | connect to CCD1# | ground | | reserved | |

FIG. 5

Smart Card interface signals

| PCMCIA PIN | Legacy Devices | | | | Smart Card | |
|---|---|---|---|---|---|---|
| | 16-bit PC Card | | CardBus PC Card | | Smart Card | |
| | Signal | I/O | Signal | I/O | Signal | I/O |
| 17, 51 | VCC | | VCC | | VCC | |
| 58 | RESET | O | CRST# | O | RESET | O |
| 47 | A18 | O | Reserved | | CLOCK | O |
| 32 | D2 | I/O | Reserved | | Rvd_C4 | O |
| | GND | | GND | | GND | |
| 18 | VPP1 | | VPP1 | | VPP | |
| 16 | IREQ# | I | CINT# | I | I/O | I/O |
| 40 | D14 | I/O | Reserved | | Rvd_C8 | O |

FIG. 7A

Smart Card Detection signals

| PCMCIA PIN | 16-bit PC Card | | CardBus PC Card | | Smart Card | |
|---|---|---|---|---|---|---|
| | Signal | I/O | Signal | I/O | Signal | I/O |
| 63 | STSCHG# | I | CSTSCHG | I | Smart Card | I |
| 36 | CD1# | I | CCD1# | I | CD1# | I |
| 43 | VS1# | I | CVS1# | I/O | VS1# | I/O |
| 57 | VS2# | I | CVS2# | I/O | VS2# | I/O |
| 67 | CD2# | I | CCD2# | I | CD2# | I |

FIG. 7B

INTEGRATED PC CARD HOST CONTROLLER FOR THE DETECTION AND OPERATION OF A PLURALITY OF EXPANSION CARDS

This application is a continuation application of application Ser. No. 09/536,578, now U.S. Pat. No. 6,470,284, filed Mar. 28, 2000 and assigned to the same assignee, which is hereby incorporated by reference in its entirety. This application claims priority to Provisional Application Ser. Nos. 60/147,544, filed Aug. 5, 1999, 60/161,249 filed Oct. 25, 1999 and 60/174,948 filed Jan. 7, 2000, all of which are incorporated herein by reference.

FIELD OF THE INVENTION

The present invention relates to an integrated controller for the detecting and operating one or more expansion cards. More specifically, the present invention relates to an integrated controller for detecting and controlling PC Cards (16-bit PCMCIA cards and 32 bit-CardBus cards), and smart cards. Particular utility of the present invention is to provide an integrated controller for mobile computing devices, e.g., laptop computers, etc, although other utilities are contemplated herein.

DESCRIPTION OF RELATED ART

The need for security and enhanced privacy is increasing as electronic forms of identification replace face-to-face and paper-based ones. The emergence of the global Internet, and the expansion of the corporate network to include access by customers and suppliers from outside the firewall, have accelerated the demand for solutions based on public-key technology. A few examples of the kinds of services that public key technologies enable are secure channel communications over a public network, digital signatures to ensure image integrity and confidentiality, and authentication of a client to a server (and visa-versa).

Smart cards are a key component of the public-key infrastructure that Microsoft is integrating into the Windows platform because smart cards enhance software-only solutions such as client authentication, logon, and secure e-mail. Smart cards are essentially a convergence point for public key certificates and associated keys because they provide tamper-resistant storage for protecting private keys and other forms of personal information; isolate security-critical computations involving authentication, digital signatures, and key exchange from other parts of the system that do not have a "need to know"; and enable portability of credentials and other private information between computers at work, home, or on the road.

It is estimated that the smart card will become an integral part of the Windows platform because smart cards will enable new breeds of applications in the same manner that the mouse and CD-ROM did when they were first integrated with the Personal Computer (PC). Incompatibility among applications, cards, and readers has been a major reason for the slow adoption of smart cards outside of Europe. Interoperability among different vendors' products is a necessary requirement to enable broad consumer acceptance of smart cards, and for corporations to deploy smart cards for use within the enterprise.

ISO 7816, EMV, and GSM

In order to promote interoperability among smart cards and readers, the International Standards Organization (ISO) developed the ISO 7816 standards for integrated circuit cards with contacts. These specifications focused on interoperability at the physical, electrical, and data-link protocol levels. In 1996, Europay, MasterCard, and VISA (EMV) defined an industry-specific smart card specification that adopted the ISO 7816 standards and defined some additional data types and encoding rules for use by the financial services industry. The European telecommunications industry also embraced the ISO 7816 standards for their Global System for Mobile communications (GSM) smart card specification to enable identification and authentication of mobile phone users.

While all of these specifications (ISO 7816, EMV, and GSM) were a step in the right direction, each was either too low-level or application-specific to gain broad industry support. Application interoperability issues such as device-independent APIs, developer tools, and resource sharing were not addressed by any of these specifications.

PC/SC Workgroup

The PC/SC (Personal Computer/Smart Card) Workgroup was formed in May 1996 in partnership with major PC and smart card companies: Groupe Bull, Hewlett-Packard, Microsoft, Schlumberger, and Siemens Nixdorf. The main focus of the workgroup has been to develop specifications that solve the previously mentioned interoperability problems. The PC/SC specifications are based on the ISO 7816 standards and are compatible with both the EMV and GSM industry-specific specifications. By virtue of the companies involved in the PC/SC Workgroup, there is broad industry support for the specifications and a strong desire to move them onto an independent-standards tract in the future.

Since its founding and initial publication of the specifications, additional members have joined the PC/SC Workgroup. New members include Gemplus, TBM, Sun Microsystems, Toshiba, and Verifone.

Microsoft's Approach

Microsoft's approach consists of the following:

A standard model for interfacing smart card readers and cards with PCs

Device-independent APIs for enabling smart card-aware applications

Familiar tools for software development

Integration with Windows and Windows NT platforms

Having a standard model for how readers and cards interface with the PC enforces interoperability among cards and readers from different manufacturers. Device-independent APIs serves to insulate application developers from differences between current and future implementations. Device-independence also preserves software development costs by avoiding application obsolescence due to underlying hardware changes.

The most popular method currently being used to interface a smart card with a notebook computer is to use a PCMCIA Type II smart card reader/writer (FIG. 1). PCMCIA smart card readers are currently available from companies such as Gemplus, SCM Microsystems and Tritheim Technologies, to name a few. The end user cost for these smart card readers is typically around $150. The cost of the reader is a major portion to the cost of the overall security solution. The adapter card 104 in FIG. 1 depicts the major functional blocks of a conventional smart card reader. The PCIC Host Interface block of the smart card reader provides the electrical interface to the PC Card connector (106 which in turn connects to the PC Card controller 102. Additional logic is provided to control the interaction between the smart card and the software application. However, as noted above, this solution carries a significant per unit cost, and thus, is an unattractive alternative to large-scale migration to smart card compatibility.

Thus, there exists a need to provide an integrated host controller that provides PC Card, smart card, and Passive smart card adapter operability. Moreover, there exists a need to provide an integrated controller that can replace existing motherboard-mounted PC Card host controllers, without having to retool or redesign the motherboard.

SUMMARY OF THE INVENTION

Accordingly, one object of the present invention is to provide an integrated PC Card and Smart card controller suitable to replace conventional PC Card controllers for integration into current PC motherboard technology.

It is another object to provide a controller as above that is simultaneously fully compatible with PC Card specifications.

It is still another object to provide a Smart card controller, as above, that has an identical pinout arrangement as existing PC Card controllers, thereby permitting the controller to be directly integrated onto a PC motherboard without redesigning and/or retooling costs.

It is another object of the present invention to provide logic and methodology to detect the presence of a smart card or a Passive smart card adapter utilizing existing PC Card specified signals.

In one aspect, the present invention provides a method of detecting the presence of an expansion card using conventional PC Card specification signal lines, during the initial card detection sequence. The method comprising the steps of determining the signal state of a first and second card detection signal lines; determining the signal state of a first and second voltage select signal lines; determining if said first and/or second card detection signal lines, or said first and/or second voltage select signal lines, comprise a signal state that is reserved by a PC Card signal specification; and determining the signal state of a predetermined unused PC Card signal line, relative to said reserved signal state. During the card detection sequence the status change signal (STSCHG) is used to detect a smart card or a smart card adapter. After the detection sequence is completed the STSCHG signal has the original uses based on the PC Card specification for signal defination. Also, in the preferred embodiment, this process determines the presence of a smart card or a Passive smart card adapter by determining whether said first card detection signal and said second voltage select signals are tied together.

In logic form, the present invention provides a device to detect the presence of an expansion card using conventional PC Card specification signal lines, comprising a state machine including a lookup table and a plurality of logic sets, each said logic sets operable to interface with a certain predefined expansion card type, said state machine accepting as input signals a plurality of predetermined card detection and voltage selection signals, and an additional signal, and coupling an appropriate one of said logic sets to an appropriate one of said expansion cards based on a match between said input signals and said lookup table.

In another aspect, the present invention provides an integrated circuit for the detection and operation of a plurality of expansion cards, comprising, a first logic set for detecting and operating a plurality of expansion card types, said first logic set having predetermined signal lines and a pinout arrangement defined by PC Card specifications, and a second logic set for detecting and operating a smart card, wherein said first and second logic being incorporated into a single controller without requiring additional pinouts. In the preferred embodiment, the second logic set is adapted to reassign certain ones of said predetermined signal lines to detect and operate said smart card, so that additional pins are not required.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 5 is a table of conventional PC Card detection and voltage sensing pin arrangements, and an example of the use of a pin arrangement for smart card detection employed by the controller of the present invention;

FIGS. 7A and 7B depict tables showing conventional PCMCIA assigned functional pins and their use for Smart Card interface and detection, respectively.

DETAILED DESCRIPTION OF EXEMPLARY EMBODIMENTS

Figure 1:
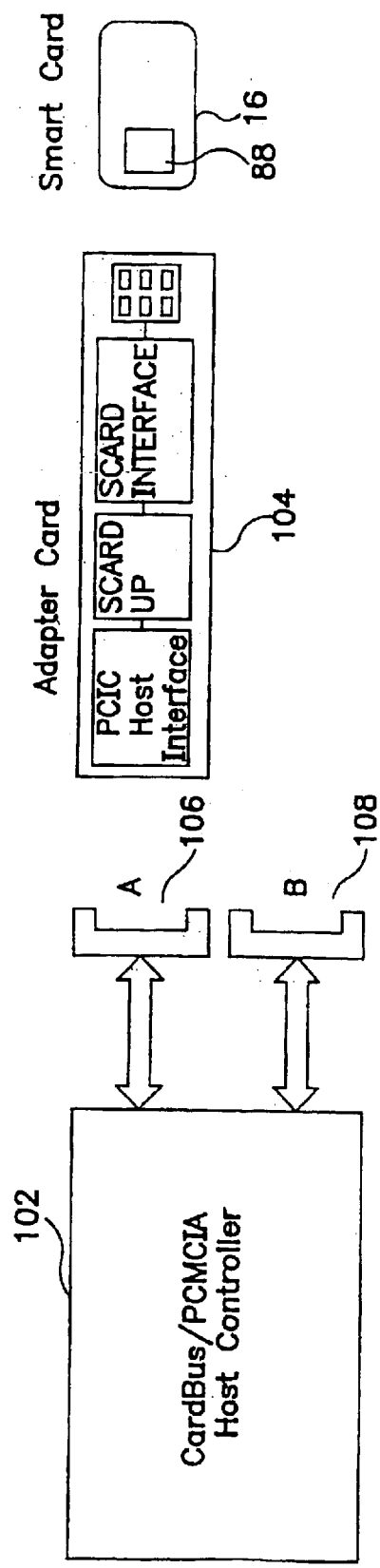
FIG. 1 depicts a block diagram of a conventional solution to incorporate smart card operability for PC applications.
Figure 2:
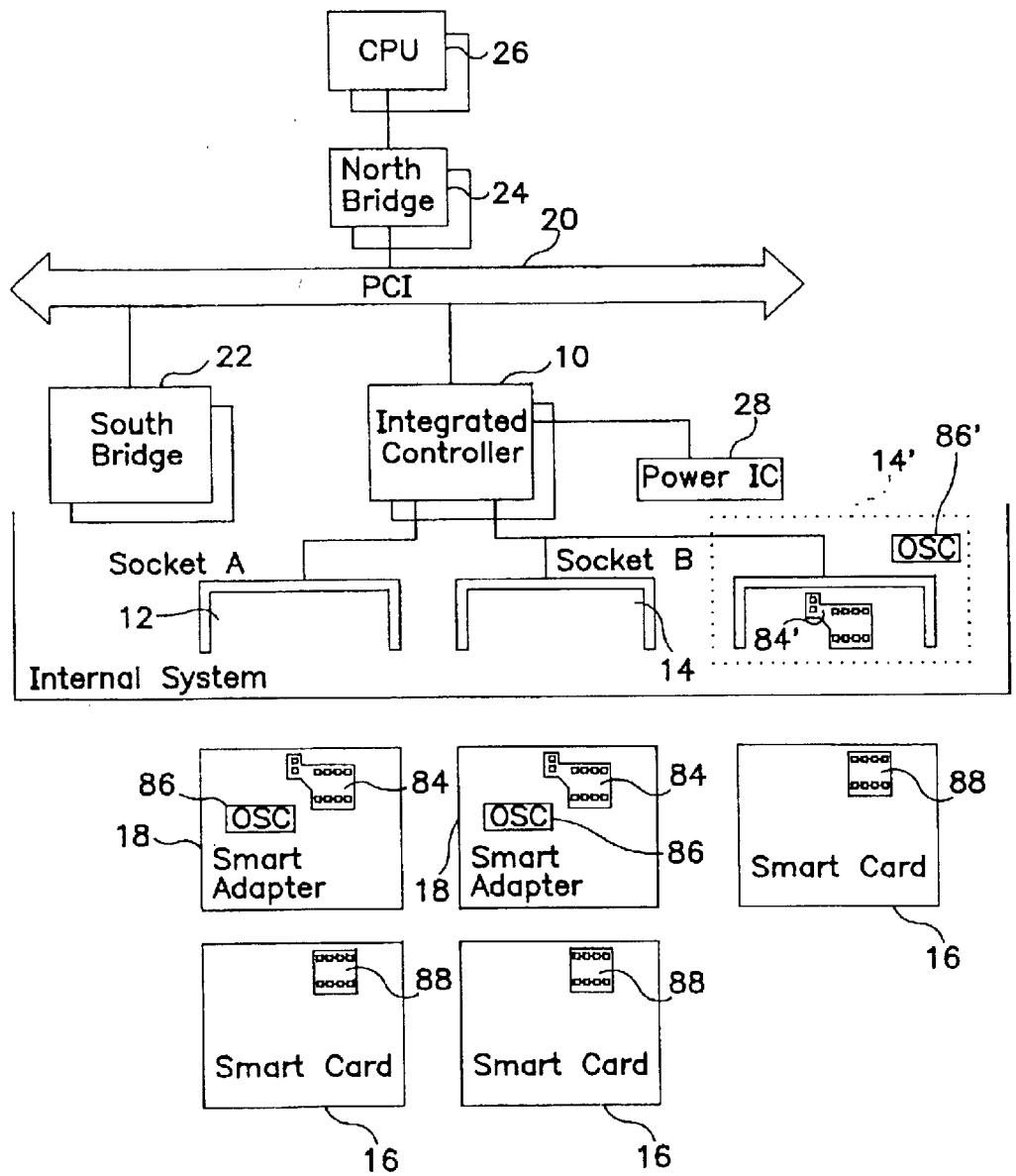
FIG. 2 is a system-level block diagram of the integrated smart card reader of the present invention.

FIG. 2 depicts a system-level block diagram of how the passive smart card adapter and a smart card interface with a host controller. The controller 10 is integrated into a PC platform, for example, laptop PC. As an example, the PC may be configured as shown, with the controller 10 operating to detect and control one or more expansion device cards that are inserted into Socket A 12 and/or Socket B 14. It will be understood that the controller 10 of present invention is adapted with the appropriate logic to drive PC Cards as well as smart cards. The PC system typically includes a processor 26 and a data bus 20. "North Bridge" logic 24 provides communication between the processor 26 and the bus 20. The controller 10, of the present invention is likewise adapted to communicate with the bus 20. In this example, the bus 20 is a PCI bus, however, any bus technology can be incorporated into the controller's logic. To complete the picture, "South Bridge" logic is provided for external bus communications, for example, legacy devices (ISA bus architecture), etc. South Bridge and North Bridge logic are well known in the art. Power IC chip 28 supplies the correct voltages (as determined by the card type inserted into Socket A or B) to the pins of the PC Card connector. Once the type of card is detected (based on the PC Card definitional table of FIG. 5, discussed below), chip 28 supplies the appropriate voltage for that card type.

In one embodiment, the present invention provides a passive smartcard adapter 18 which is configured to be inserted into either Socket A 12 or Socket B 14, which are in turn configured as either PC Card type I/II/III—type socket interface. The passive adapter 18 of this embodiment includes appropriate connector 84 and passive circuit 86. The smart card 16 inserted into the passive smart card adapter 18 also includes physical contacts 88 to interface with the physical connector 84 of the adapter. Pinout arrangements 84 and 88 of the adapter and smart card are dictated by the smart card specification, for example PC/SC compliant Smart card specification that meets ISO 7816 electrical specifications and T=0, T=1 protocols. In this embodiment the use of an adapter 18 permits smart card readability and operability without retooling the PC case to include a specific smart card socket. Alternatively, the PC can include a smart card slot 14' as shown in FIG. 2. In this alternative embodiment, the logic 86 and connector 84 are, of course, provided internally within socket 14.

Figure 3:
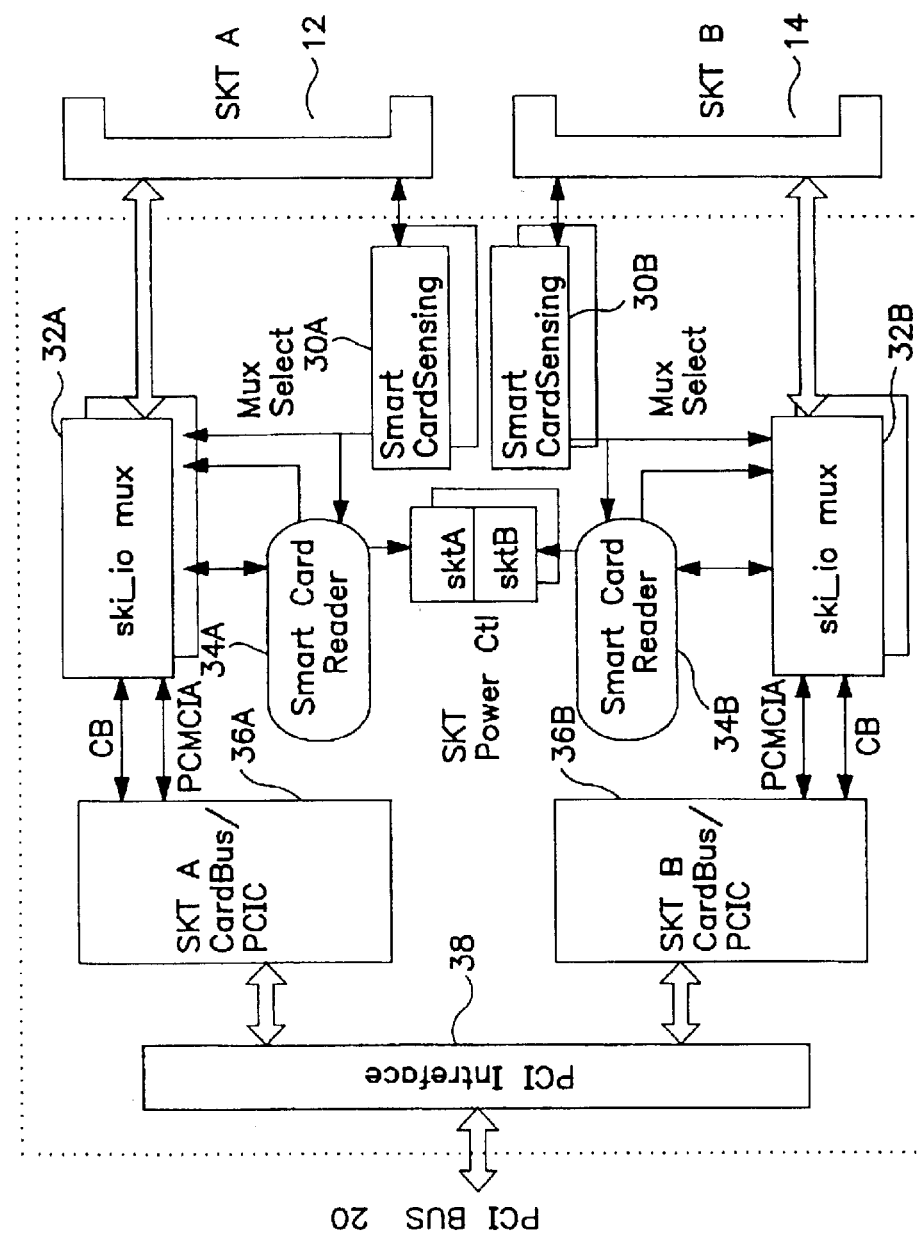
FIG. 3 is a detailed block diagram of the integrated Smart card reader of the present invention.

Referring now to FIG. 3, a more detailed block diagram of the integrated controller 10 is depicted, showing those logic portions directed to smart card detection and operability. In this example, the controller 10 includes smart card sensing logic 30A and 30B, Smart card multiplexer (MUX) logic 32A and 32B, Smart card reader logic 34A and 34B and interface logic 36A and 36B.

It should be noted at the outset that FIG. 3 depicts only the logic associated with smartcard and Passive smart card adapter detection and operability, and it should be understood that controller 10 includes additional logic (not shown) to permit detection and operation of conventional PC Card's. Conventional PC Card controllers detect the type of card inserted into a slot using a set of card detection pins, CD1 and CD2, and a set of voltage sense pins VS1 and V52. The coupling combinations between these pins (with reference to ground) indicate to the appropriate logic which type of card has been inserted into the socket. For example, as shown in the table of FIG. 5, the coupling combination of CD1, CD2, VS1 and V52 determine whether the PC Card inserted is a 16-bit PCMCIA card or a 32-bit CardBus card. Moreover, a sis shown in the table, this combination also determines the driving voltage for the particular type of card. For example, 3.3 V, 5 V, X.X V and Y.Y V. In the last two rows of the table of FIG. 5, it is to be noted that the listed combinations of CD1, CD2, VS1 and V52 are reserved in the PC Card specification. The present invention utilizes one of these reserved combinations of CD1, CD2, VS1 and VS2, and additionally uses a status change signal, STSCHG, to indicate whether a smart card has been inserted into the slot (either directly, or via an adapter). The status change signal is preferably used in the present invention since this signal is not utilized during the detection process for conventional PC Card cards, and is only used once the card type is known.

Figure 4:
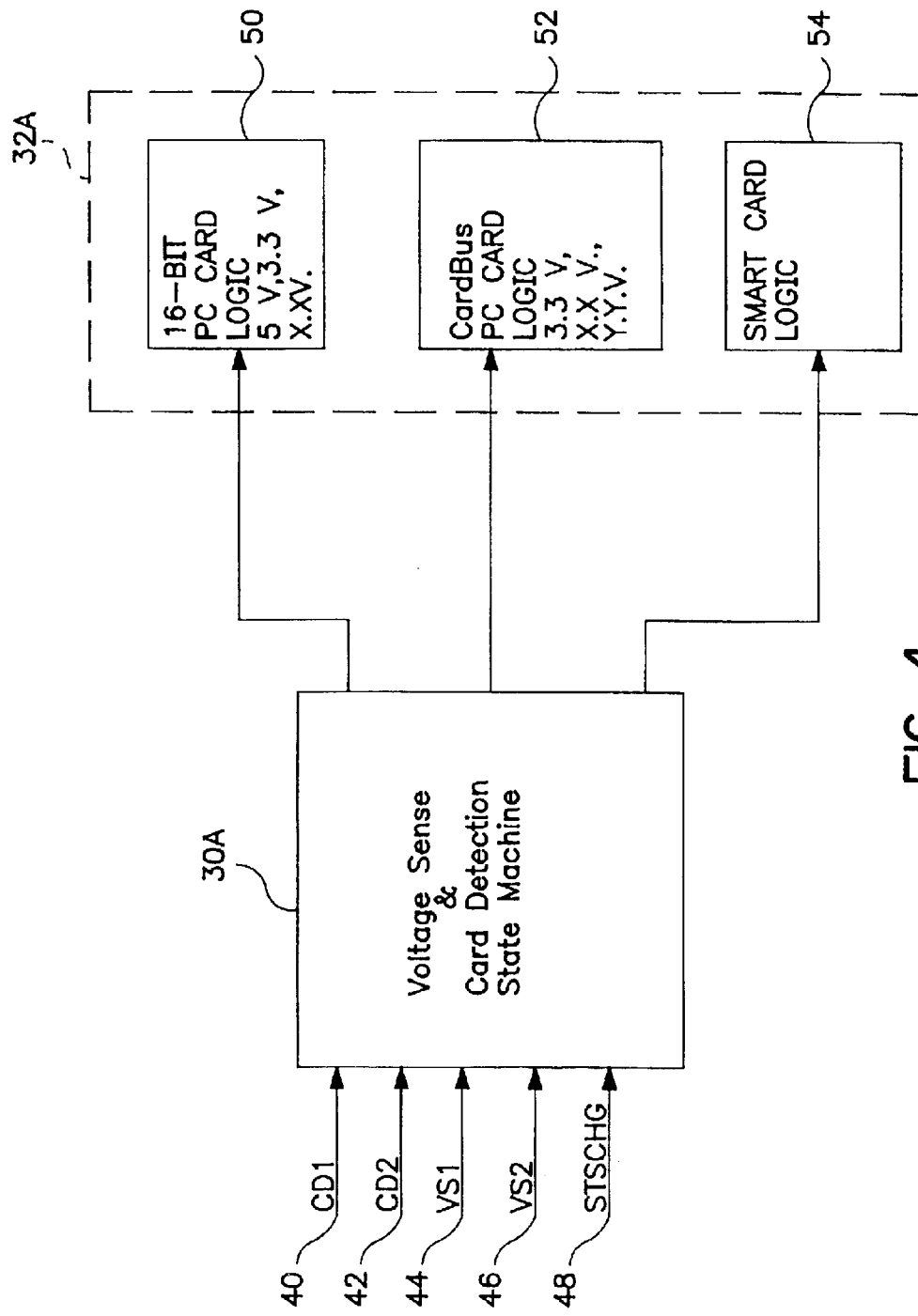
FIG. 4 is a state machine block diagram of the integrated Smart card reader of the present invention.

Thus, in one sense, the smart card sensing logic 30A shown in FIG. 3 can be viewed as a state machine that determines the type of card inserted into a socket. To that end, and referring to FIG. 4, a state machine representation of the card sensing logic 30A of FIG. 3 is depicted. As is shown, the card sensing logic 30A accepts as inputs CD1, CD2, VS1, V52 and status change (labeled 40, 42, 44, 46 and 48, respectively). In accordance with the reserved arrangement of CD1, CD2, VS1, V52 as shown in FIG. 5, and the addition of the status change signal, the state machine 30A determines the appropriate logic 32 A for communicating with the4 given type of card. For example, certain combinations of CD1, CD2, VS1, V52 (as indicated in FIG. 5) will dictate that the card inserted into the socket is either a 16-bit PC card or a 32-bit CardBus PC card. Accordingly, the state machine 30A will activate the appropriate logic 50 or 52 for the given card type. It should also be noted that the particular voltage of the inserted card is also determined using the combination of these four pins. Extending the capabilities of conventional PC Card controllers, the present invention also monitors the 575 CHG pin to determine if a smart card or a passive smart card adapter has been inserted into the socket, and likewise activates the appropriate logic 54 to communicate with the smart card, for example, logic 32A as shown in FIG. 3. To determine the states of CD1, CD2, VS1, V52 and STSCHG, the card sensing logic 30A can produce, for example, a pulse train signal on selected ones of these pinouts, and by monitoring the signal on one or more of the other pins (with respect to ground), it can then be determined the card type inserted into the socket.

The smart card sensing logic 30A and 30B operate to detect both a smart card or a passive smart card adapter and PC Cards, based on the Table in FIG. 5. The pin assignments shown in FIG. 5 are designated by the PC Card specification, and are conventional pin assignments for these signal lines. The identity of the card is determined by the values of the voltages of columns 1–4, i.e., CD2, CD1, V52 and VS1. Both smart card and passive smart card adapter detection operates by utilizing the reserved combinations of these pins, plus the use of an additional pin, for example, STSCHG signal line. The concept is summarized in the Table of FIG. 7B. This table shows the pins used to detect PC Cards, smart cards and Passive smart card adapter cards. The signal column for a smart card or passive smart card adapter detection includes one of the reserved areas for CD1, CD2, VS1 and V52, as shown in the last two rows of Table of FIG. 5. It should be noted that although the figures depict the use of signal line STSCHG (which is provided by the conventional PC Card specification), the present invention, generally, could use any pin in the PC Card specification that is unused during the card detection sequence. In other words, from a timing perspective, certain signal lines in the PC Card specification remain unused during the card detection process. The present invention utilizes one (or more) of these signal lines, in conjunction with the reserved combination of CD1, CD2, VS1, and V52, to effectuate smart card or passive smart card adapter detection. Thus, the figures represent only one of many examples for the use of an additional signal pin that could be used for smart card detection.

Figure 6:
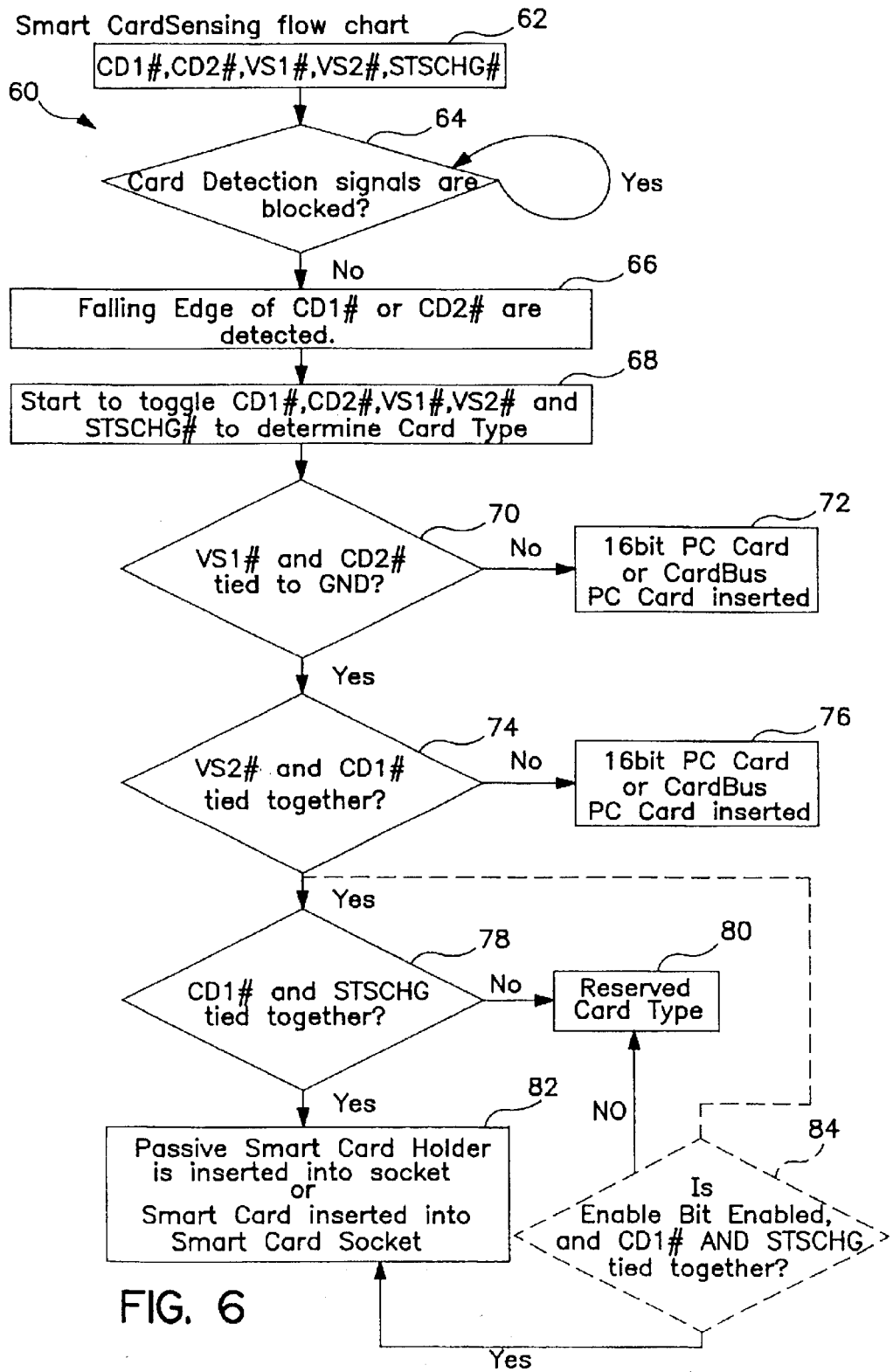
FIG. 6 is a flowchart of an exemplary smart card and passive smart card adapter detection scheme of the present invention.

A flow chart 60 of the card-type detection process is depicted in FIG. 6. For clarity, the corresponding reference numerals of the logic to detect and operate PC Card, smart card and passive smart card adapter cards (as shown in FIGS. 2 and 3) are omitted. Initially, the detection logic seeks the presence of CD1, CD2, VS1, V52, and STSCHG 62. If not present, or otherwise unavailable, it is assumed the no card has been inserted into a socket, and thus the card detection signals (CD1 and CD2) are blocked 64. Once a card is inserted, the detection logic monitors the falling edge of CD1 or CD2 66. This is dictated by the PC Card specification for determining the presence of a card. Once a card is detected, the detection logic of the present invention toggles CD1, CD2, VS1, V52, and STSCHG to determine the type of card inserted 68. Toggling, as cited above, can be in the form of a pulse train signal, or other toggling signal. The detection logic proceeds by polling CD1, CD2, VS1, V52, and STSCHG in the following manner. First, the logic determines if VS1 and CD2 are tied to ground 70. If not, it is known that a 16-Bit PCMCIA Card or 32-bit CardBus card is inserted 72, as indicated by the table of FIG. 5. If yes, the logic determines if V52 and CD1 are tied together 74. If this is not the case, again it is known that a 16-Bit Card or 32-bit CardBus card is inserted 76, as indicated by the table of FIG. 5. If it is determined that CD1 and STSCHG are tied together 78, then it is determined that a smart card or a passive smart card adapter is present. Either the passive smart card adapter is inserted into the socket, or a smart card is inserted directly into a smart card socket 82.

Another feature of the present invention is to provide an integrated controller circuit 10, which can be directly integrated with current PC Card controller logic. Conventional PC Card controller logic is an IC package that is mounted directly on the motherboard, which has 208 pins, and each of these pins is assigned by the PC Card specification. Another feature is to provide a controller 10 that can directly replace conventional controllers, without having to reconfigure pin assignments, add additional pin configurations, alter the motherboard, or change the tooling required. To that end, and referring to the table of FIG. 7A, the controller 10 of present invention includes both conventional, legacy interface card signals and smart card signals. As is shown in this table, the same pins (leftmost column) used to interface with conventional 16 and 32 cards are likewise used to interface with the smart card. Thus, no additional pins are required. Referring again to FIG. 3, if a smart card is detected into a socket, logic 30A or 30B communicates with and enables logic 34A or 34B, to enable smart card readability. Logic 34A and 34B enable the socket MUX logic 32A or 32B, so that the socket (A or B) can communicate with the cardbus/PCI controller logic 36A or 36B, which communicate with the PCI bus 20 (via PCI interface 38). As should be understood, the smart card logic 30A, 30B, 34A and 34B of the present invention directly interfaces with the MUX logic 32A and 32B and communicates with bus interface controllers 36A and 36B using conventional PC Card 2 communication protocols. If a conventional card is inserted into a socket (socket A or B), then conventional logic (not shown) incorporated into the controller 10 activates MUX 32A and 32B and communicates with bus interface controllers 36A and 36B using conventional PC Card communication protocols.

To facilitate direct integration with conventional PC Card logic sets, the present invention controls a predetermined number of pre-assigned pins to effectuate smart card communication. For example, as shown in FIG. 7A, pins 17, 51, 58, 47, 32, GND, 18, 16 and 40, as specified by the PC Card standard, are utilized by the present invention to operate both smart cards and PC cards. Therefore, no extra pins are required by the controller 10 to effectuate Smart card operability. In operation, once the smart card has been detected (as described above with reference to FIGS. 3–6), logic 34A or 34B reassigns the operability of the PC Card pins noted in FIG. 7A to effectuate Smart card readability. The signal assignments, set forth under the smart card Signal column of FIG. 7A, are the required signals to read smart Cards.

The table and FIG. 7A is included as a lookup table in the controller 10 of the present invention to operate PC Cards. Likewise, the tables of FIG. 5 and FIG. 7B are included as lookup tables in the controller 10 for the detection of PC Cards and smart Cards. To this end, and view the logic sets 30A and 30B as a state machine (shown in FIG. 4), the state machine compares the input signals to the lookup tables of FIGS. 5 and 7B to couple the appropriate logic to the card.

Those skilled in the art will recognize that CDI, CD2, VS1 and V52 comprise card detect and voltage select signals, respectively, as specified by the conventional PC Card signal specification. In the tables of FIGS. 5, 7A and 7B, and the flowchart of FIG. 6, the nomenclature used for these signal lines includes, for example, CDI#, CD2#, VS1#, V52#, etc., which are the formal names for these conventional signal lines. However, it should be apparent that the use of CD1, CD2, VS1 and V52 are shorthand versions of these formal names, and may be used interchangeably.

Thus, it is evident that there has been provided an integrated Smart card controller and Smart card detection process that satisfies the aims and objectives stated herein. It will be apparent to those skilled in the art that modifications are possible. For example, although the present invention has been described with reference to detection and operation of smart Cards, the present invention is equally adapted for the detection and operation of any type of expansion cards, in addition to conventional PC Cards. Other modifications are possible. For example, it may be desirable to include a software lock on the operability of the smart card logic shown herein. Accordingly, the logic depicted in FIG. 3 can include an enable bit, which selectively turns on and off smart card detectability and operability. To that end, and referring to FIG. 6, the smart card detection process may alternatively include the step of determining if an enable bit is enabled, and if CD1 and STSCHG are tied together 84. If this is not the case, the smart card the logic will not detect the presence of a smart card. This feature of the present invention permits, for example, manufacturers to offer smart card compatibility as an upgrade option, while still integrating the core logic of the controller 10. Those skilled in the art will recognize additional modifications, and all such modifications are deemed within the scope of the present invention, only as limited by the appended claims.

What is claimed is:

1. A system for the detection and operation of a Smart Card, comprising:
    a socket for receiving a Smart Card;
    an integrated controller comprising a first logic set for detecting said Smart Card, a second logic set for operating said Smart Card; and
    a bus interface controller to provide communications with a bus interface and said smart card using conventional PC card communication protocols; and
    a second socket for receiving a PC Card;
    said integrated controller further comprising a third logic set to detect and operate said PC Card, said bus interface controller adapted to provide communication between said PC Card and said bus interface using said conventional PC Card communication protocols.

2. A system as claimed in claim 1, wherein said bus comprises a PCI bus and said bus interface controller is adapted to communicate using PCI bus and conventional PC card communication protocols.

3. A system as claimed in claim 1, wherein said PC Card is selected from the group of a CardBus Card or a PCMCIA card.

4. An integrated controller for expansion media, comprising:
    a first circuit adapted to detect and operate a Smart Card, a second circuit adapted to detect and operate a PC Card; and
    a bus interface controller to provide communications with a bus interface and said Smart Card and/or said PC Card using conventional PC card communication protocols.

5. A system as claimed in claim 1, wherein said PC Card communication protocols comprise CardBus and/or PCMCIA communication protocols.

6. A system as claimed in claim 1, wherein said PC Card communication protocols comprise CardBus and/or PCMCIA communication protocols.

7. A system as claimed in claim 1, further comprising a MUX logic set adapted to provide input/output communications between said bus interface controller and said first and/or second logic sets.

8. A controller as claimed in claim 4, wherein said PC Card communication protocols comprise CardBus communication protocols.

9. A controller as claimed in claim 4, wherein said PC Card communication protocols comprise PCMCIA communication protocols.

* * * * *